May 5, 1953    N. MILLER    2,637,064
SHRIMP PEELING AND VEINING MACHINE
Filed Sept. 22, 1950    3 Sheets-Sheet 1

Nikoli Miller
INVENTOR.

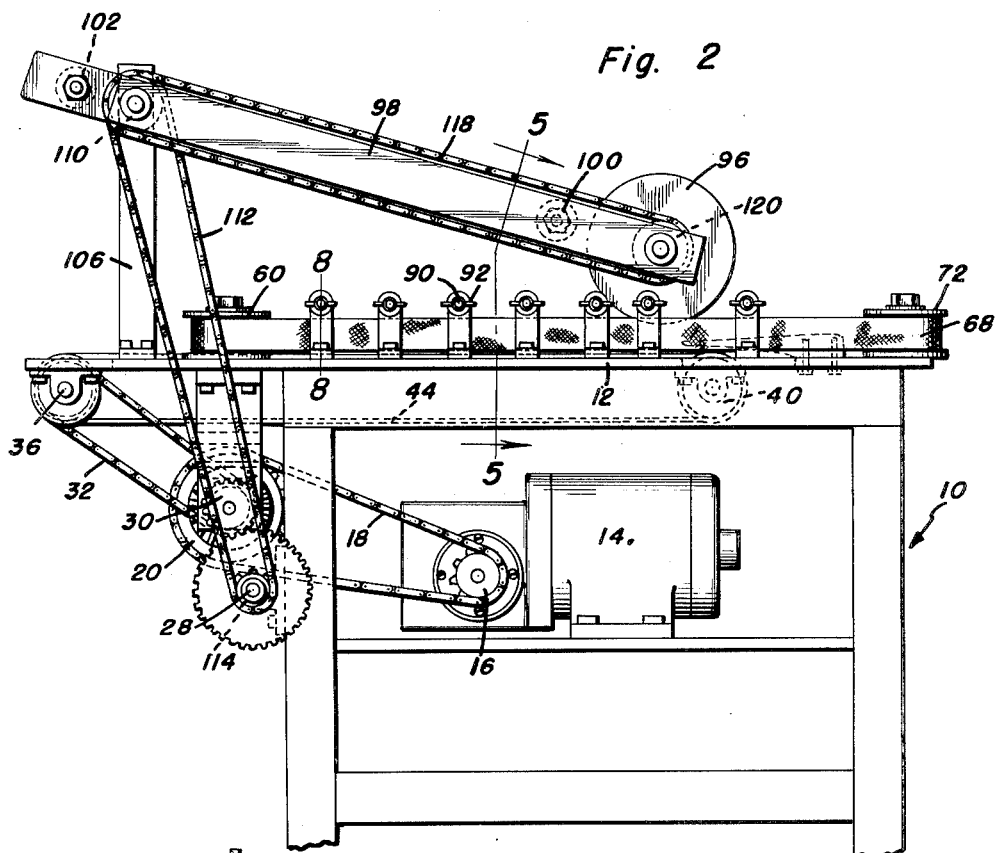
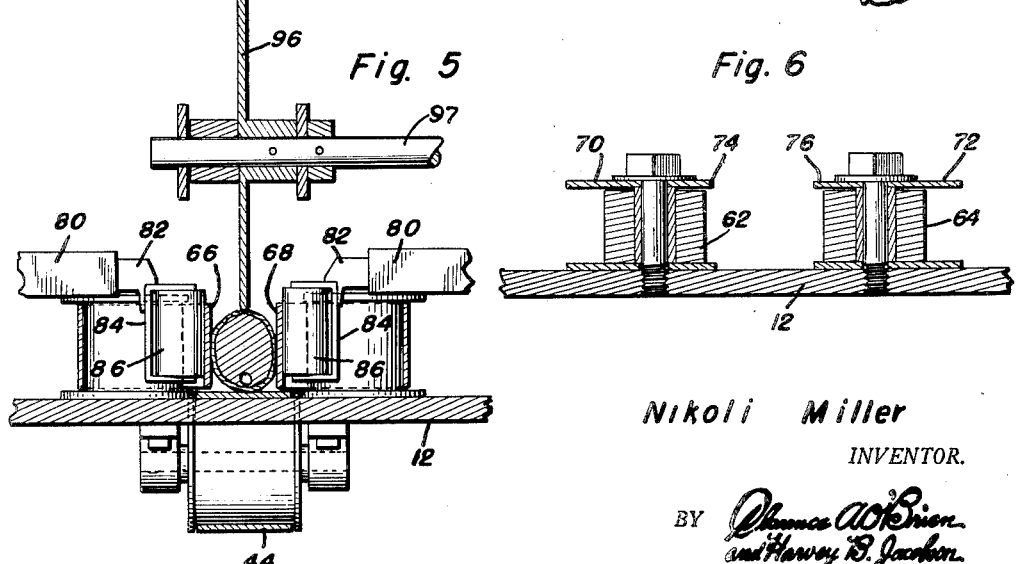

May 5, 1953  N. MILLER  2,637,064
SHRIMP PEELING AND VEINING MACHINE
Filed Sept. 22, 1950  3 Sheets-Sheet 3

Nikoli Miller
INVENTOR.

Patented May 5, 1953

2,637,064

UNITED STATES PATENT OFFICE 2,637,064

SHRIMP PEELING AND VEINING MACHINE

Nikoli Miller, Manteo, N. C.

Application September 22, 1950, Serial No. 186,279

10 Claims. (Cl. 17—2)

This invention relates to a food processing apparatus and more particularly to a device adapted to separate the vein and shell from the meat of a shrimp.

As is well known in the industry, one of the most expensive steps necessary in the packing of shrimp or the canning thereof is the removal of the vein and the shell from the shrimp. While it is realized that various devices have been suggested for this purpose, these have proved somewhat unsatisfactory because of their high initial cost and because of their sometimes ineffective and always erratic operation. Therefore, this process is, for the most part, now being carried on by hand. It is therefore an object of this invention to provide an extremely simple and compact device which will readily perform this heretofore difficult and expensive operation in a positive manner at a rapid rate.

Another object of this invention is to provide a device which will rapidly separate the shell and vein from the meat of the shrimp and which will deposit the shell and vein at a different locale from where the meat is carried.

Various features are included in this shrimp peeling and veining machine which consist of conveyor means for delivering the shrimp against a blade which is adapted to penetrate the shrimp which had previously been beheaded so as to urge the meat to cause the shell to rupture adjacent the upper and weakest point thereof. These elements of the invention are mounted on a platform which has a discharge opening therein through which the shell is deposited. There is also provided a roller for maintaining the proper amount of downward pressure on the shrimp when such is in engagement with the blade.

Still further objects of the invention reside in the provision of this shrimp peeling and veining machine which is strong, durable, highly efficient in operation, simple in construction and manufacture, capable of processing a large number of shrimp in a minimum period of time, and which machine is deft and sure in its operation while requiring a minimum amount of attention.

These, together with the various ancillary objects of the invention which will become apparent as the following description proceeds, are attained by this shrimp peeling and veining machine, a preferred embodiment of which has been illustrated in the accompanying drawings, by way of example only, wherein:

Figure 2 is a side elevational view of the invention;

Figure 5 is an enlarged vertical transverse sectional detail view as taken along the plane of the section line 5—5 in Figure 2;

Figure 6 is an enlarged vertical transverse sectional detail view as taken along the plane of the section line 6—6 in Figure 1;

Figure 1:
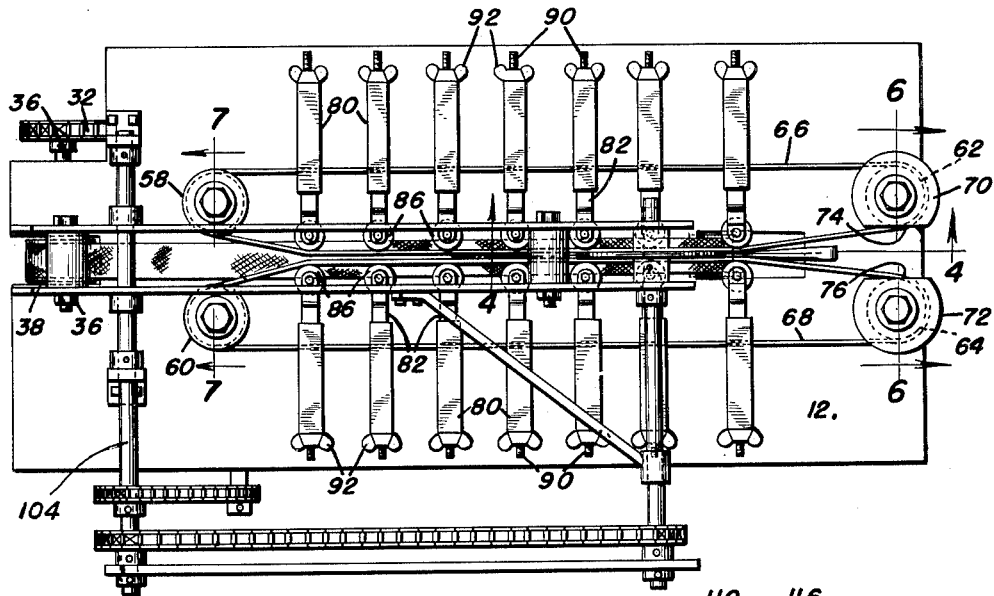
Figure 1 is a top plan view of the shrimp processing apparatus comprising the present invention, the driving motor and its support being omitted from the apparatus.
Figure 3:
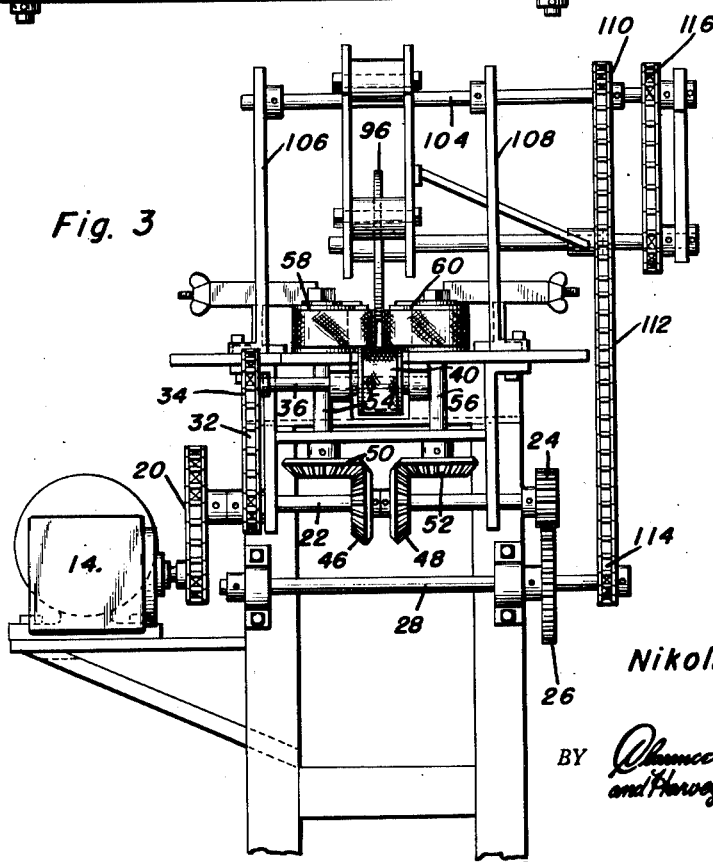
Figure 3 is an end elevational view of this shrimp peeling and veining machine, being taken from the left end of Figure 1.

Referring more specifically to the accompanying drawings, wherein like reference numerals designate similar parts throughout the various views, and more especially to Figures 2 and 3, reference numeral 10 is generally used to designate any suitable supporting table which may be used to support the platform 12. Supported by the table 10 is a prime mover 14 which drives a first sprocket gear 16. The sprocket gear 16 is drivingly connected by means of a chain 18 to a sprocket gear 20 which is mounted on a shaft 22. It is to be noted that while chain drives have been used in the present embodiment of the invention, this device may be equally well driven by belts, pulleys, or any other suitable drive means.

Figure 4:
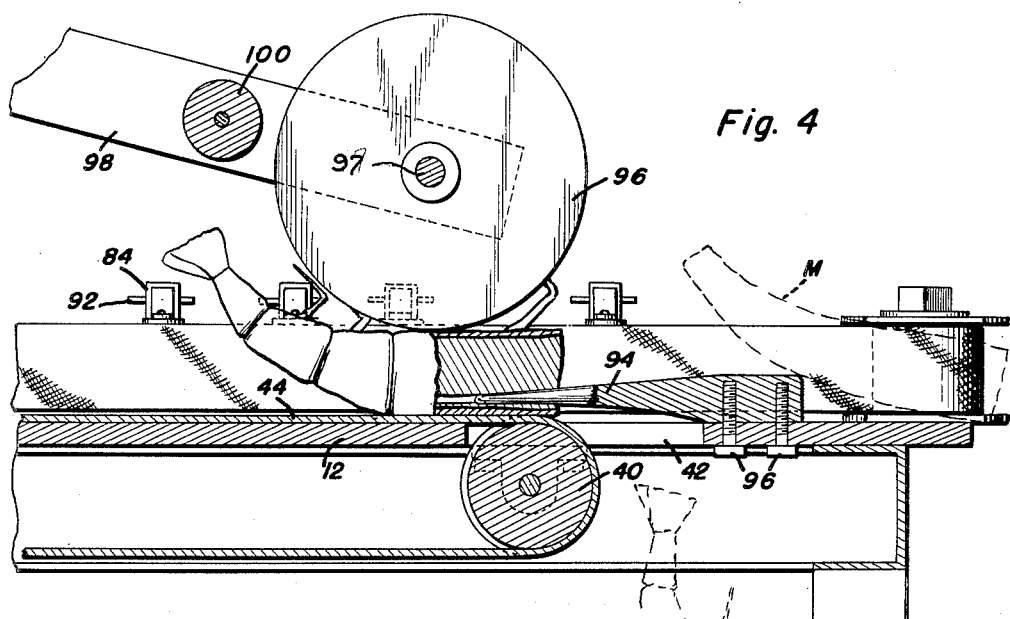
Figure 4 is an enlarged vertical longitudinal sectional detail as taken along the plane of the section line 4—4 in Figure 1.

Also mounted on the opposite end of the shaft 22 as shown in Figure 3 is a gear 24 which drivingly engages a gear 26 mounted on a shaft 28. Further, there is mounted on the shaft 22 a sprocket wheel 30 which is connected by a chain 32 to a sprocket wheel 34 mounted on a shaft 36 on which a pulley 38 is secured. Another pulley 40, see Figure 4, is rotatably mounted below the platform 12 in alignment with a discharge opening 42 formed in the platform 12. A belt 44 is trained about the pulleys 38 and 40 to form a horizontal belt conveyor.

Figure 7:
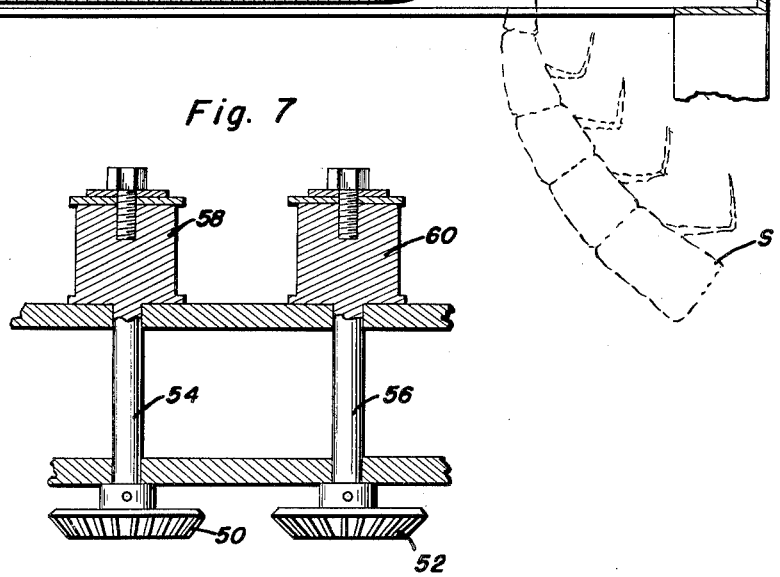
Figure 7 is another enlarged vertical transverse sectional detail view as taken along the plane of the section line 7—7 in Figure 1.
Figure 8:
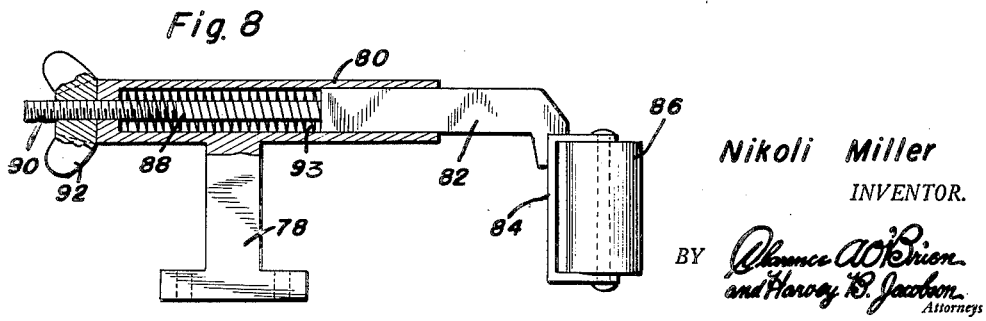
Figure 8 is an enlarged vertical transverse sectional detail view of the means for adjusting the spaced relationship of the spaced conveyors, being taken substantially upon the plane indicated by the section line 8—8 of Figure 2.

Also secured on the shaft 22, as shown in Figure 7, are bevel gears 46 and 48 which drive the horizontally positioned bevel gears 50 and 52 which drive shafts 54 and 56, respectively, on which pulleys 58 and 60 are carried. Other pulleys 62 and 64, see Figure 6, are mounted on the platform and belts 66 and 68 are entrained about the pulleys 58 and 62, and 60 and 64, respectively. These belts 66 and 68 produce a pair of laterally spaced vertical belt conveyors. It is to be noted that the pulleys 62 and 64 are positioned under guide flanges 70 and 72 which have cut-away portions, as at 74 and 76, so as not to hinder the discharge of the meat of the shrimp, as will hereinafter be explained.

Mounted on the platform 12 by means of suitable brackets 78 which are bolted to the platform 12 are tubular members 80 within which plungers 82 are inserted. The plungers 82 each carry a fork 84 within the confines of which rollers 86 are journaled. A threaded rod 88 extends rearwardly from the plungers 82 and is threaded, as at 90, for engagement by a wing nut 92. A coil spring 93 coaxial with the rod 88 biases the plunger 82 and the wing nut 92 so as to continuously urge the rollers 86 into engagement with the adjacent portions of the belts thereby yieldingly urging the latter towards each other to form opposed yieldable moving side walls for conveying the shrimp.

With the shrimp fed in its proper position, as shown in Figure 4, at the start of the belts 66 and 68 and 44, the shrimp will be carried upon the horizontal belt 44 and retained in fixed position thereon by the vertical belts 66 and 68 and will be carried against the stationary wedge-shaped blade 94 which is bolted by means of bolts 96 to the platform 12. The blade will then penetrate the shrimp which is fed after it has been beheaded, so as to urge the meat upwardly to cause a rupture adjacent the weak point of the shell and so as to carry the meat upwardly over the blade, as is indicated at M in the drawings. The shell and vein are then urged downwardly due to the action of the blade 94 through the discharge opening 42 in the platform 12. For properly urging the shrimp downwardly into position on the conveyor 34 and into engagement with the blade 94 is a roller 96 fixedly secured to an axle 97 which is carried by an arm 98 and is journaled thereon. The arm 98 is suitably weighted, as at 100 and 102 and is freely rotatably mounted on a shaft 104 extending between standards 106, 108 which extend upwardly from the platform 12. Mounted on the shaft 104 is a drive pulley 110 which is connected by means of chain 112 which is connected to a sprocket 114 mounted on the shaft 28. Another sprocket gear 116 is mounted on the shaft 104 which is connected by means of chain 118 to drive a sprocket gear 120 upon the axle 97 in order to rotate the drive roller 96.

In operation, the shrimp is fed by hand with its front end foremost and its tail uppermost into the conveyor system between the spaced conveyors 66 and 68. It is then delivered into engagement with the blade 94 which urges the meat upwardly from the vein and shell to thus rupture and remove the shell. The blade urges the shell downwardly and removes such from the meat. The meat is then carried over the blade 94 as is indicated at M by the two side conveyors and drops from the diverging ends of the latter at the end of the platform while the shell is deposited through the discharge opening 42, as is indicated at S.

It is to be noted that the roller 96 is rotated due to proper gearing at the same speed of revolution as the conveyor belts. This roller presses and places the shrimp at the point of the blade which catches the section of the shrimp where the vein is located. Thus, a positive action on the shrimp will be obtained.

It will be further apparent that the springs 94 will cause the rollers 86 to press the belts towards each other to frictionally and resiliently grasp the shrimp therebetween. This inward thrust of the rollers is adjustably limited by the wing nuts 92, providing an adjustable minimum clearance between the belts.

Since, from the foregoing, the construction and advantages of this shrimp peeling and veining device is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may readily be resorted to which fall within the scope of the appended claims.

Having described the invention, what is claimed as new is:

1. A shrimp peeling and veining machine including a platform having a discharge opening therethrough, an elongated piercing tool mounted above said platform and having a point overlying said opening, means operatively associated with said platform for moving a shrimp upon its back and head end foremost across said platform towards said opening and piercing tool, said piercing tool having its point positioned to penetrate longitudinally the body of a shrimp at the sand vein of the shrimp as the latter is moved across the platform upon its back towards said tool whereby the shell and sand vein are removed from the shrimp and are urged by said tool through said discharge opening and the meat of the shrimp is directed over said tool.

2. The combination of claim 1 wherein said piercing tool is stationary.

3. The combination of claim 1 wherein said piercing tool is stationarily mounted upon said platform rearwardly of said opening.

4. The combination of claim 1 wherein said moving means comprises a pair of spaced conveyor belts forming opposed moving side walls between which the shrimp is carried and means for adjusting the spaced relationship of said spaced conveyor belts.

5. The combination of claim 1 wherein said moving means comprises a pair of spaced conveyor belts forming opposed moving side walls between which the shrimp is carried, a horizontal belt conveyor positioned below said spaced conveyor belts and resting upon said platform.

6. The combination of claim 1 wherein said moving means comprises a pair of spaced conveyor belts forming opposed moving side walls between which the shrimp is carried and means for adjusting the spaced relationship of said space conveyor belts, said last means comprising rollers resiliently engaging the portion of the conveyor belts forming the moving side walls and urging the side walls towards each other and threaded means for limiting the position of the rollers.

7. A shrimp peeling and veining machine including a platform having a discharge opening therethrough, an elongated piercing tool mounted above said platform and having a point overlying said opening, means operatively associated with said platform for moving a shrimp upon its back and head end foremost across said platform towards said opening and piercing tool, said piercing tool having its point positioned to penetrate longitudinally the body of a shrimp at the sand vein of the shrimp as the latter is moved across the platform upon its back towards said tool whereby the shell and sand vein are removed from the shrimp and are urged by said tool through said discharge opening and the meat of the shrimp is directed over said tool, a rotatable pressure wheel disposed above said piercing tool, means supporting and journaling said pressure wheel, means operatively associated with said pressure wheel for rotating said pressure wheel.

8. A shrimp peeling and veining machine including a platform having a discharge opening therethrough, an elongated piercing tool mounted above said platform and having a point overlying said opening, means operatively associated with said platform for moving a shrimp upon its back and head end foremost across said platform towards said opening and piercing tool, said piercing tool having its point positioned to penetrate longitudinally the body of a shrimp at the sand vein of the shrimp as the latter is moved across the platform upon its back towards said tool whereby the shell and sand vein are removed from the shrimp and are urged by said tool through said discharge opening and the meat of the shrimp is directed over said tool, a horizontal shaft mounted above and extending transversely of said platform, an arm mounted upon said shaft for vertically pivoting movement, a pressure wheel rotatably journaled on said arm for pressing a shrimp downwardly upon said platform adjacent said piercing tool, means operatively connecting said pressure wheel to said shaft, means operatively associated with said pressure wheel for rotating said shaft.

9. A shrimp peeling and veining machine including a platform having a discharge opening therethrough, an elongated piercing tool mounted above said platform and having a point overlying said opening, means operatively associated with said platform for moving a shrimp upon its back and head end foremost across said platform towards said opening and piercing tool, said piercing tool having its point positioned to penetrate longitudinally the body of a shrimp at the sand vein of the shrimp as the latter is moved across the platform upon its back towards said tool whereby the shell and sand vein are removed from the shrimp and are urged by said tool through said discharge opening and the meat of the shrimp is directed over said tool, a horizontal shaft mounted above and extending transversely of said platform, an arm mounted upon said shaft for vertically pivoting movement, a pressure wheel rotatably journaled on said arm for pressing a shrimp downwardly upon said platform adjacent said piercing tool, means operatively connecting said pressure wheel to said shaft, means including interconnecting drive means for rotating said shaft, in timed relation to movement of said moving means.

10. The combination of claim 7 wherein said last mentioned means includes means for causing movement of said moving means and said pressure wheel at such speed that the linear speed of the pressure wheel at the moving means and the shrimp carried thereby is equal to the linear speed of the shrimp and the moving means.

NIKOLI MILLER.

References Cited in the file of this patent

UNITED STATES PATENTS

| Number | Name | Date |
| --- | --- | --- |
| 1,627,479 | Bucknam | May 3, 1927 |
| 2,034,691 | Bottker et al. | Mar. 24, 1936 |
| 2,147,633 | Bottker | Feb. 21, 1939 |
| 2,263,697 | Grayson | Nov. 25, 1941 |
| 2,518,772 | Grausgruber | Aug. 15, 1950 |